July 7, 1925.
J. W. SCHADE
1,544,601
TOOL FOR CONSOLIDATING TACKY SHEETS
Filed Aug. 4, 1921

Inventor
James W. Schade
By Robert M. Pierson
Atty.

Patented July 7, 1925.

1,544,601

UNITED STATES PATENT OFFICE.

JAMES W. SCHADE, OF AKRON, OHIO, ASSIGNOR TO THE B. F. GOODRICH COMPANY, OF NEW YORK, N. Y., A CORPORATION OF NEW YORK.

TOOL FOR CONSOLIDATING TACKY SHEETS.

Application filed August 4, 1921. Serial No. 489,912.

*To all whom it may concern:*

Be it known that I, JAMES W. SCHADE, a citizen of the United States, residing at Akron, in the county of Summit and State of Ohio, have invented a certain new and useful Tool for Consolidating Tacky Sheets, of which the following is a specification.

This invention relates to the art of combining plies of tacky material, such, for example, as the rubber or rubber treated fabric sheets employed in the manufacture of footwear, which sheets are commonly pressed together by a manually operated roller having a smooth continuous cylindrical surface. In the manufacture of footwear an inferior article is often produced because the rolling pressure applied in consolidating the sheets forming a part thereof is not sufficient to press the plies into intimate contact, the defects in the material showing more often when the tacky sheets are pressed together by rollers operated by girls.

The principal objects of the present invention are to overcome these difficulties.

Figure 1:
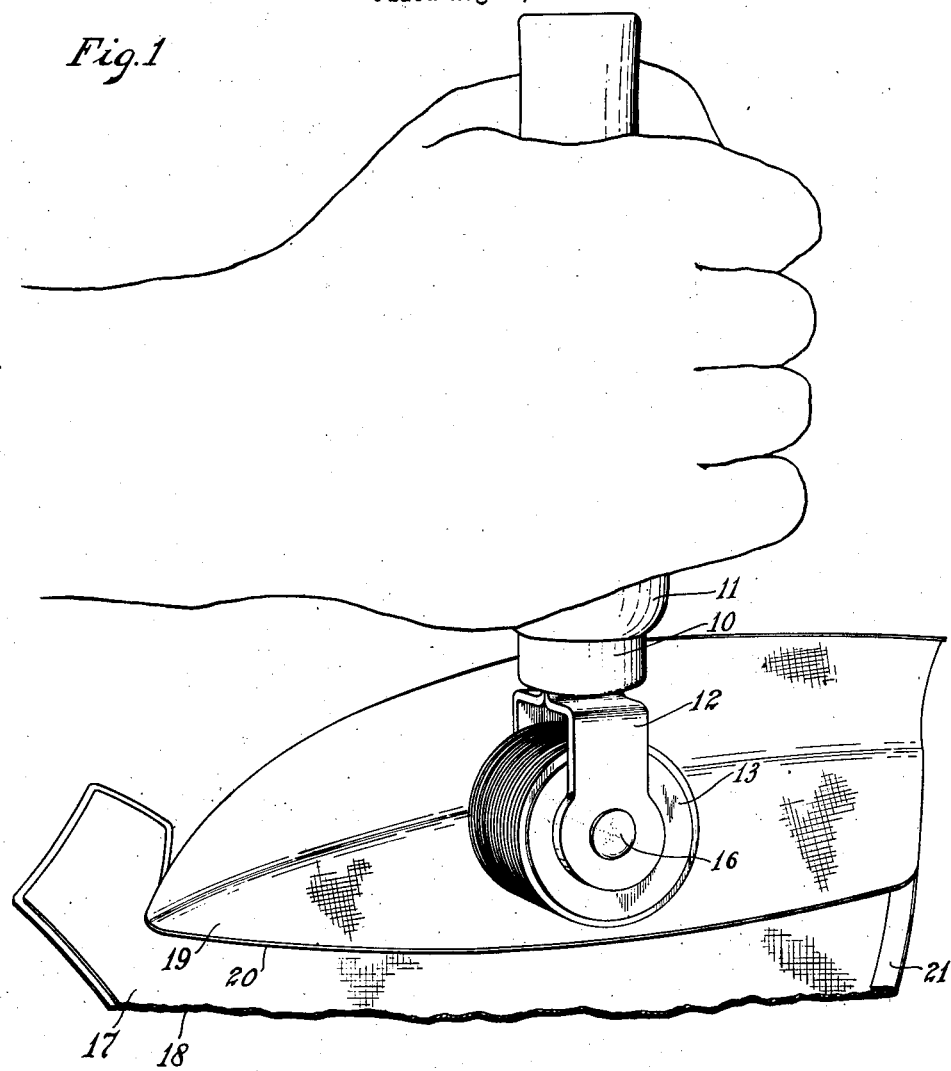

Of the accompanying drawings, Fig. 1 is a perspective view of a roller embodying and adapted to carry out my invention and illustrating the use of the same in consolidating the plies of material.

Figure 2:
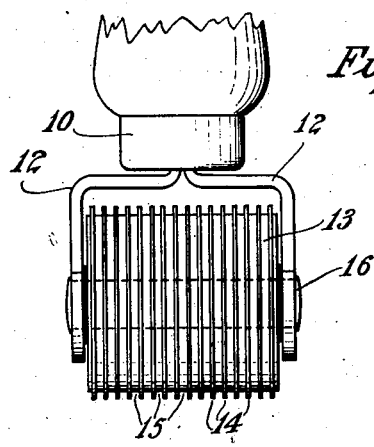

Fig. 2 is a front view of a part of the roller.

In these drawings, 10 is a roller, 11 the handle thereof, 12 a metal yoke driven into one end of the handle and embracing at its outer end a cylindrical rotatable wheel 13 having a broken or grooved surface portion, herein a series of parallel, annular ridges 14, separated by grooves 15, and 16 is a pin carried by the yoke and on which the roller rotates.

The material operated on by the roller is shown as a part of a shoe quarter and comprises a sheet 17 of frictioned fabric, a surfacing 18 of unvulcanized rubber on the lower face thereof and a rubber treated fabric ply 19 having a skim coat 20 of tacky rubber on its lower face. In the building of one form of quarter one end 21 of the sheet 17 is doubled back upon itself and the rubber surfaced ply 19 is pressed onto the sheet and consolidated therewith by a rolling pressure applied to the upper surface of the quarter while the structure is supported by a table (not shown).

In carrying out my invention the roller is pressed against the upper surface of the quarter and moved along parallel and intersecting paths until the surfaces on the radial projections on the wheel come into contact with substantially the whole upper surface of the sheet 19 consolidating or compacting the structure under a greater pressure per unit of area than when the surface of the roller is unbroken, without leaving depressions or grooves in the surface of the stock. The relatively great length of the wheel in comparison with its effective area provides a wide bearing for the wheel on the shoe stock and insures the holding of the wheel against the stock for its full width, thus avoiding applying the pressure on one edge of the wheel by tilting the roller laterally. In my preferred form of roller the closely spaced projections on the wheel have substantially one-third the effective area of a smooth surfaced cylindrical wheel of the same size, and the pressure applied to the handle is three times as effective in compacting the plies of the tacky material as when applied to a smooth surfaced roller of the same size.

The design of the wheel surface and the effective area thereof may be varied according to the pressure to be applied and the material operated on to insure an intimate compacting of the plied stock without making a substantial impression in its upper surface.

I claim:

A hand tool for compacting plies of tacky material upon a plane surface, said tool comprising a handle, a yoke secured thereto, and an integral cylindrical roller journaled in said yoke, said roller having a plurality of separate, spaced-apart, annular depressions, the aggregate width of the depressions at the surface of the roller being greater than half the width of the roller.

In witness whereof I have hereunto set my hand this 2nd day of August, 1921.

JAMES W. SCHADE.